United States Patent Office 3,053,857
Patented Sept. 11, 1962

3,053,857
EPOXYALIPHATIC AMIDE PRODUCTION
George B. Payne, Berkeley, Calif., assignor to Shell Oil Company, a corporation of Delaware
No Drawing. Filed Dec. 29, 1959, Ser. No. 862,477
10 Claims. (Cl. 260—348)

This invention relates to the production of alpha,beta-epoxyaliphatic amides from unsaturated nitriles having a vinyl or alkyl-substituted vinyl group directly linked to the nitrile carbon atom.

While certain substituted glycidamides are known, glycidamide itself is a new compound which has not heretofore been described in the chemical literature. The known substituted aliphatic glycidamides have been made by expensive methods such as epoxidation of the corresponding unsaturated amides with monoperphthalic acid as described in U.S. Patent 2,493,090, for instance. Saturated nitriles can be converted to amides with hydrogen peroxide according to the "Radziszewski Reaction," Berichte, vol. 17, page 1289 (1884), two moles of hydrogen peroxide being consumed and a mole of oxygen being evolved for each mole of amide produced. This might lead one to hope that epoxy amides could possibly be produced by reacting three moles of hydrogen peroxide per mole of unsaturated nitrile to effect epoxidation simultaneously with the Radziszewski Reaction. However, although unsaturated nitriles having aromatic substituents to activate or otherwise influence the reaction have been converted to epoxyamides by reaction with hydrogen peroxide [see Murray and Cloke, J.A.C.S., vol. 56, page 2749 (1934)], up to now, no success has been reported in producing epoxy aliphatic amides from the corresponding unsaturated aliphatic nitriles and hydrogen peroxide.

It is an object of the present invention to provide a method for producing alpha,beta-epoxy aliphatic amides directly from the corresponding alpha,beta-ethylenic nitriles in one step by reaction with hydrogen peroxide. Another important object is the production of alpha,beta-epoxyaliphatic amides in this way with greatly reduced consumption of peroxide due to operation under conditions at which oxygen evolution is substantially suppressed. A special object of the invention is the provision of new classes of epoxyamides, which have many advantageous properties.

It has been discovered that by careful control of the reaction conditions, particularly the pH of the reaction mixture, it is possible to react alpha,beta-ethylenic aliphatic nitriles with hydrogen peroxide and obtain directly the corresponding alpha,beta-epoxyaliphatic amides with consumption of only one mole of peroxide per mole of epoxy amide product. This was unexpected not only because of the previous lack of success in obtaining any epoxy amide from aliphatic unsaturated nitriles and hydrogen peroxide but also because it would have been predicted on the basis of the Radziszewski reaction that, if this reaction were to be made to take place, the consumption of hydrogen peroxide would have to be at the uneconomically high rate of three moles per mole of epoxy amide product.

In accordance with the invention alpha,beta-epoxy aliphatic amides are produced by reacting the corresponding alpha,beta-ethylenic aliphatic nitriles with hydrogen peroxide while maintaining the pH of the reaction mixture in the range of about 6.0 to about 9.0, more advantageous from 7.0 to 7.5. When the pH of the reaction mixture is controlled in this way, oxygen evolution is negligible and only one molar equivalent of hydrogen peroxide is consumed whether the peroxide or aliphatic unsaturated nitrile is used in excess in the reaction. The 1:1 stoichiometry of the reaction and the lack of oxygen evolution, prove that the reaction is not a simple combination of epoxidation of the ethylenic double bond with hydration of the nitrile group according to the Radziszewski reaction. Rather, there is evidence to show that the mechanism of the reaction involves reaction of peroxide anion with the carbon atom of the nitrile group or groups of the starting alpha,beta-ethylenic aliphatic nitrile (I) to form a peroxycarboximidic acid intermediate (II) which is then converted to the desired alpha,beta-epoxyaliphatic amide (III). The chief by-products usually encountered are the hydration product of the epoxyamide, e.g., glyceramide or its alkyl-substitution products (IV), and a relatively small amount of the ethylenic amide. This mechanism of reaction can be represented by the following equations for the simultaneously occurring reactions:

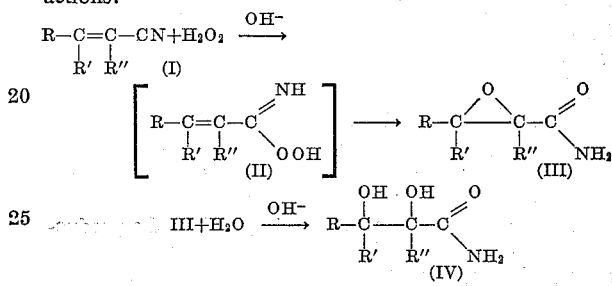

The alpha,beta-ethylenic aliphatic nitriles which are used as starting materials for epoxy amides according to the invention are those having three to twelve carbon atoms per molecule. Alpha,beta-ethylenic aliphatic hydrocarbon nitriles of the foregoing formula in which each of the three R's in each molecule is hydrogen or a lower alkyl group, preferably of 1 to 3 carbon atoms, are especially advantageous. The beta-methylene alkanonitriles of this type, namely acrylonitrile and its alpha-lower alkyl substitution products such as methacrylonitrile, alpha-ethylacrylonitrile, alpha-normal propylacrylonitrile, and alpha-isopropylacrylonitrile are an especially useful subgroup of starting materials because of the high yields of the corresponding alpha,beta-epoxypropionamides which can be obtained therewith. Thus, one type of nitrile especially useful as starting material for the process of the invention is an acrylonitrile in which the carbon atoms of the vinyl group are linked only to members of the group consisting of hydrogen and unsubstituted lower alkyl groups.

As previously pointed out, it is essential to the success of the new process that the pH of the reaction mixture be maintained between about 6.0 and about 9.0 during the reaction of the chosen alpha,beta-ethylenic aliphatic nitrile or mixture of such nitriles with the hydrogen peroxide. The highest yields are usually obtained when the pH is maintained about 7.0 to about 7.5. Any suitable method of maintaining the pH within these ranges can be employed in the process. Usually the pH can be conveniently maintained in the chosen range by adding a basic agent. Either organic or inorganic basic agents can be used successfully those which are soluble in the reaction mixture being especially advantageous. Because of their availability and low cost, basic inorganic compounds are generally more advantageous. Suitable bases of this kind are inorganic hydroxides, examples of which are the alkali and alkaline earth hydroxides such as sodium hydroxide, potassium hydroxide, ammonium hydroxide, magnesium hydroxide, calcium hydroxide, etc.; the corresponding oxides, for instance, sodium oxide, calcium or magnesium oxide and the like; and basic salts such as the water-soluble carbonates, bicarbonates, phosphates and the like; such, for instance, as sodium carbonate or bicarbonate, tripotassium phosphate, etc. Among the organic bases which can be used, although generally they are less to be preferred because of their higher cost, are, for instance, amines such as mono-, di- or trimethylamine, the corresponding ethyl and isopropyl amines, and the like, and quaternary ammonium hydroxides such for instance as benzyl ammonium hydroxide which is sold as a 35% solution in methanol by Mid-West Chemical Company, under the trade name "Triton B." Salts of phenols such as potassium and calcium phenates, sodium metamethyl phenoxide, sodium naphthoxide, etc. are another class or organic basic agents which can be successfully used. There are operating advantages sometimes in using an insoluble form of basic compound. Anion exchange resins, especially amine or quaternary ammonium base resins, are a particularly convenient form of insoluble base for use in the new process. Examples of suitable base resins are, for instance, the amination products of chloromethylated styrene-divinylbenzene copolymers described in U.S. 2,591,573 and sold by Rohm and Haas as "Amberlite IRA–400" and "IRA–401"; resins made by the process of U.S. 2,388,235 and those sold by Dow Chemical Company as "Dowex 1." These may be used in the free base form or in the form of the salts, for instance, the carbonate salts of the strong base resins.

The alpha,beta-ethylenic aliphatic nitrile and hydrogen peroxide react with each other in 1:1 molar proportions even when either is present in excess so the proportions of these reactants is not critical to the success of the reaction. As a general rule it is desirable not to use so large an excess of either reactant as to unduly reduce the production rate of the plant through undue dilution of the reaction mixture. As a rule mole proportions of ethylenic nitrile to peroxide in the range of about 10:1 to about 1:10 can be used although proportions of about 2:1 to 1:1.5 are preferred and about equimolar proportions are most economical because the cost of recovery of excess reactant for recycling to the reaction is reduced.

The hydrogen peroxide used can be any of the usually available solutions but it is preferable to use hydrogen peroxide of sufficient concentration so that excessive dilution of the reaction mixture with water is avoided since excessive amounts of water promote hydration of the epoxy amide and thus reduce the yield of this product. As shown in the following examples, initial concentrations of 5% and higher can be used, but the invention is not restricted to such concentrations. Of course where the epoxy amide is intended for conversion to the dihydroxy amide such hydration during the reaction may not be undesirable in which case peroxide of lower concentrations may be desirable, but for epoxyamide production it is generally preferred to use hydrogen peroxide of about 25% to about 70% weight concentration.

To reduce by-product formation it is usually desirable that the reaction temperature be kept below 100° C. and generally it will be most advantageous to operate in the range of about 25° C. to about 50° C. Initial reaction at a lower temperature in this range followed by completion of the reaction at a temperature in a higher portion of the range is one suitable method of efficient reaction without excessive reaction time. In the preferred method of operation the reaction will be completed in about 3 to about 10 hours.

The reactants can be added to the reactor in any order or can be introduced simultaneously. Efficient reaction is promoted by intimate contact of the reactants which can be obtained by means of a stirred autoclave or other suitable reactor or by pumping the reactants through a coil or other form of pipe reactor at a sufficient rate to provide the required mixing. Batch, intermittent or continuous methods of reaction can be used. Suitable inert organic solvents can be used in the reaction mixture to promote the desired intimate contact and/or aid in temperature control.

The invention is further illustrated by the following examples showing some of the different ways in which it can be applied.

*Example I*

To a 1-liter, 5-neck, round-bottom flask equipped with mechanical stirrer, dropping funnel, thermometer, condenser, and standard electrodes connected to a Beckman pH Meter, were charged 53 g. (1.0 mole) of acrylonitrile, 300 ml. of distilled water and 1.20 moles of 30% hydrogen peroxide (standardized before use). The mixture was stirred at 35° while N sodium hydroxide was added through the dropping funnel as needed to maintain the pH at 7.3–7.5. After 5 hours, an iodometric titration indicated the presence of 0.25 mole of hydrogen peroxide (reaction 95% complete); titration for oxirane oxygen showed 0.69 mole of that group to be present. The consumption of 70 ml. of alkali indicated that 7 mole percent of acidic by-product had been formed. Oxygen evolution, as measured by a wet test meter connected to the top of the condenser, amounted to only 0.012 mole.

The reaction mixture was treated with 100 mg. of 5% paladium on charcoal (to decompose excess peroxide) and stored overnight in the refrigerator. After removal of this catalyst, the mixture was concentrated at 30–40 mm. by means of a circulating evaporator. Titration of the volatile material (467 ml.) for oxirane oxygen indicated the presence of only 0.016 mole of volatile epoxide. The concentrate (175 g.) contained 0.64 mole of epoxide by titration. A duplicate bromine number also indicated the presence of 0.11 mole of acrylamide, while titration for alpha-glycol (as a measure of glyceramide) by sodium periodate showed 0.23 mole in the concentrate. (Subsequent blank determinations showed that glycidamide reacted neither with bromine nor with periodate.)

A 128 g. portion of the 175 g. of concentrate was used for the isolation of pure glycidamide. This was de-salted by dissolving it in 3 volumes of acetone, drying over 150 g. of magnesium sulfate, and concentrating under vacuum to a colorless liquid weighing 37 g. When attempted recrystallization failed, this material was carefully Claisen-distilled at 0.2 mm. using an oil bath for heat. Concurrent resinification was indicated by a pot temperature about 5° higher than that of the oil bath; nonetheless, 15.7 g. (25% yield) of glycidamide, B.P. 72–73° (0.2 mm.) was secured. It solidified on standing (M.P. 30–33°) and was 96% pure by titration for oxirane oxygen (theory: 18.4; found, 17.6). Material of analytical purity was obtained by recrystallization from a concentrated acetone solution; it was mildly hygroscopic and had M.P. 32–34°.

*Analysis.*—Calculated for $C_3H_5O_2N$: C, 41.4; H, 5.8; N, 16.1; oxirane oxygen 18.4. Found: C, 41.5; H, 5.9; N, 16.1; oxirane oxygen 18.4.

*Example II*

The effect of variations in the reaction conditions on the yield of glycidamide from acrylonitrile was determined in a series of tests carried out as in Example I using aqueous solutions such that the initial concentration of hydrogen peroxide in the reaction mixture was 5 to 15% wt. and a reaction temperature of 30° to 35° C. The pH was maintained by adding 1 normal sodium hydroxide solution except in two cases where sodium bicarbonate buffer was used. The following results were obtained:

| Exp. No. | Mole Ratio acrylonitrile to hydrogen peroxide | pH Range in reaction mixture | Reaction Time (hours) | $H_2O_2$ consumed as percent of Theoretical | Yield of glycidamide based on $H_2O_2$ percent |
|---|---|---|---|---|---|
| 1 | 0.95 | 8.8–9.2 | 1.5 | 102 | 28 |
| 2 | 0.91 | a 8 –7.5 | 22 | 97 | 57 |
| 3 | 1.50 | a 8 –7.5 | 25 | 89 | 67 |
| 4 | 1.50 | 7.0–7.5 | 10 | 92 | 77 |
| 5 | 1.20 | 7.3–7.5 | 6 | 87 | 71 |
| 6 | 1.10 | 7.5–7.7 | 7 | 93 | 67 |
| 7 | 0.67 | 7.3–7.5 | 3 | b 100 | c 69 | a $NaHCO_3$ buffer.
b Only 3 mole percent more $H_2O_2$ consumed in an additional ½ hour; 6 mole percent of oxygen evolved in 3½ hours total reaction time.
c Yield based on acrylonitrile.

In the same way by substituting alpha-isopropylacrylonitrile for acrylonitrile, alpha-isopropyl-glycidamide is obtained in good yield and by using alpha,beta-dimethylcrotononitrile alpha,beta-epoxy-alpha,beta-dimethyl-propionamide is produced. Under the same conditions 2-methyl-2-pentenenitrile affords 2-methyl-2,3-epoxyvaleramide and 2-propyl-2,3-epoxycapramide is obtained from 2-propyl-2-hexenenitrile.

*Example III*

To a 2-1 flask equipped as above were charged 500 ml. of water, 1.0 mole of 30% hydrogen peroxide and 100 g. (1.5 moles) of methacrylonitrile. The mixture was stirred at 30–35° C. and a true pH of 7.5–8 was maintained by the addition of 1 N sodium hydroxide. After 3 hours, the pH was raised to 8–8.5 for an additional 5 hours. Iodometric titration then indicated the reaction to be 97% complete, and titration for oxirane oxygen showed 0.62 mole of that functional group. Alkali consumption amounted to 0.08 mole and no oxygen evolution was observed.

The reaction mixture was processed as above to give 80 g. of pale yellow solid containing some sodium salt. The latter was removed by dissolving the crude product in acetone and filtering. After removal of acetone, the residue was recrystallized from 100 ml. of benzene to give 54 g. (65% yield) of alpha-methylglycidamide having M.P. 52–53° C. An epoxide value (HCl—MgCl$_2$) indicated a purity of 70%. Several recrystallizations from ether afforded product of analytical purity, M.P. 75–75.5° C.

*Analysis.*—Calculated for $C_4H_7NO_2$: C, 47.5; H, 7.0; oxirane oxygen, 15.8. Found: C, 47.4; H, 7.0; oxirane oxygen, 15.5, 16.1.

By using alpha-ethylacrylonitrile instead of the methacrylonitrile a good yield of alpha-ethyl-glycidamide is obtained and from 2-pentenenitrile, 2,3-epoxyvaleramide is produced. Analogous reaction of 4-methyl-2-pentenenitrile similarly affords 4-methyl-2,3-epoxy-valeramide and from 2-hexenenitrile under the same conditions 2,3-epoxycapramide is obtained.

Reaction of hydrogen peroxide at pH 7 to 7.5 in the same way with alpha-methylcrotononitrile affords a similar yield of alpha-methyl-alpha,beta-epoxybutramide while with alpha-propylacrylonitrile alpha-propylglycidamide is obtained. 3-ethylvaleramide is produced from 3-ethyl-2-pentenenitrile under analogous conditions and, preferably when using acetone as a mutual solvent 2,3-dipropyl-2,3-epoxycaproamide is produced from 2,3-dipropyl-2-hexenenitrile.

Instead of the mononitriles which have been emphasized in the foregoing, one can successfully react alpha,beta-ethylenic aliphatic nitriles which contain a plurality of cyano groups in the molecule with hydrogen peroxide at pH about 6.0 to about 9.0, preferably pH about 6.0 to 7.0 to produce alpha,beta-epoxy aliphatic amides. The alkylidenemalononitriles of 4 to 10 carbon atoms per molecule are an especially advantageous subgroup of polynitriles of this type for use in the invention since they afford new alpha-cyano-alpha,beta epoxyalkane amides. One suitable method for carrying out this modification of the invention is shown in the following example.

*Example IV*

To a one liter, 5-neck, round-bottom flask equipped with stirrer, thermometer, two dropping funnels, condenser and pH electrodes were charged 200 ml. of methanol, 50 ml. of water and 86.5 ml. (0.75 mole) of 29.6% hydrogen peroxide. The meter pH was adjusted to 6.5 with N sodium hydroxide and maintained at 6.5–6.7 as a solution of 53 g. (0.50 mole) of isopropylidenemalononitrile in 50 ml. of methanol was added dropwise with stirring and cooling at 20–25° over a 25 minute period (pH by indicator paper ca. 5.5). After an additional ten minutes, iodometric titration indicated a consumption of 0.61 mole of peroxide. After another hour, the consumption leveled at 0.71 mole. Alkali utilized in maintaining the desired pH was 0.052 equiv.; oxygen evolution, as measured by a wet test meter, amounted to 0.023 mole.

The reaction mixture, containing precipitated product, was diluted with 300 ml. of water, chilled and filtered to give 40 g. of essentially pure 3-methyl-2-cyano-2,3-epoxy-butyramide, M.P. 150.5–151°. Filtrate, after concentration to about 200 ml., gave another 7 g. of product, M.P. 149–150°. The combined yield on the two crops was 67%. A sample was recrystallized from methanol prior to analysis; M.P. 151–151.5°.

*Analysis.*—Calculated for $C_6H_8N_2O_2$: C, 51.4; H, 5.8; N, 20.0. Found: C, 51.5; H, 5.8; N, 19.7.

When this reaction was repeated using 0.60 mole of 90% $H_2O_2$ as oxidant and maintaining a pH of 7.4–7.6, the yield of 3-methyl-2-cyano-2,3-epoxy-butyramide was 69% based on isopropylidenemalononitrile and purified product was recovered boiling 53–54° C. at 5 mm. and having an index of refraction $N_D^{20}$ 1.4261.

By similar reaction of methylidenemalononitrile one obtains alpha-cyanoglycidamide while 3-propyl-2-cyano-2,3-epoxycaproamide is obtained from 3-propyl-2-cyano-2-hexenenitrile and beta-cyanoglycidamide is obtained from maleonitrile under the same conditions. When glutaconitrile is similarly reacted, delta-cyano-alpha,beta-epoxybutyramide is produced together with alpha,beta-epoxyglutaramide and from beta-cyanoethylidenemalononitrile both 2,4-dicyano-2,3-epoxyvaleramide and 2-cyano-2,3-epoxyglutaramide are obtained.

One can also successfully react in the same way alpha, beta-ethylenic aliphatic nitriles of three to 12 carbon atoms which contain substituents which do not interfere with the reaction, especially such nitriles having substituents which are inert under the reaction conditions. Typical starting materials of this type whose use is included in the new process of the invention are the alpha, beta-ethylenic aliphatic nitriles containing carboxy, ester, amido and like groups and/or halogen atoms, etc. This modification of the invention is illustrated by the following example.

*Example V*

To a one liter flask equipped as described in Example IV were charged 400 ml. of methanol and 0.57 mole of 50% hydrogen peroxide. After adjustment of the meter pH to 9.5–10.0 with N sodium hydroxide, a solution of 80 g. (0.52 mole) of ethyl isopropylidenecyanoacetate in 50 ml. of methanol was added over 30 minutes at 35–40°; ice cooling was needed. After an additional 10 minutes, iodometric titration indicated that consumption of 1 molar equivalent of peroxide; 30 ml. of caustic had been used.

After concentration under vacuumw to a volume of 200 ml., the residue was diluted with 200 ml. of water and extracted with three 150 ml. portions of chloroform. After washing with saturated ammonium sulfate solution and drying, the solution was concentrated under vacuum to a constant weight of 72 g. Recrystallization from acetone-petroleum ether gave 33 g. of 3-methyl-2,3-epoxy-2-carbethoxybutyramide, M.P. 102–103° C. A second crop amounted to 3 g., M.P. 101–102° (37% total yield).

*Analysis.*—Calculated for $C_8H_{14}NO_4$: C, 51.1; H, 7.4. Found: C, 51.1; H, 7.0.

Analogous reaction of alpha,delta-dicarbethoxy-beta-bromocrotononitrile yields alpha,delta-dicarbethoxy-beta-bromo-alpha,beta-epoxybutanamide and 2-carbethoxy-3-carbamyl-6-keto-2-heptenenitrile affords 2-carbethoxy-3-carbamyl-6-keto-2,3 - epoxyheptanamide. Similarly 4-methyl-2-carbamyl-2,3-epoxypentanamide is obtained from alpha-carbamyl-beta-isopropylacrylonitrile and 2-chloro-2,3-epoxypentanamide is produced from alpha-chloro-beta-ethylacrylonitrile.

The products of the invention have many useful properties. The alpha,beta - epoxy aliphatic hydrocarbon amides of 3 to 6 carbon atoms having terminal epoxy groups such as glycidamide and alpha-methyl glycidamide are new compounds which are especially advantageous for the production of resinous products because the epoxy group directly joined to the amide group is a terminal epoxy group which is more reactive than those present in other types of epoxyamides. Due to this special structure glycidamide and the like are especially advantageous as modifiers of epoxy resins particularly the glycidyl polyether resin such as are described and claimed in U.S. Patent 2,633,458 with which they can be mixed in proportions of about 1:10 to 1:1 and cured in the usual way to obtain products of controlled properties especially as regards flexibility. Glycidamide is also useful in making homopolymers and copolymers with other epoxides such as ethylene oxide, propylene oxide, styrene oxide and the like using Lewis acid type catalysts such as stannic chloride, or other metal salt catalysts or alkoxides. Another new class of products of the invention is the alpha-cyano-substituted alpha,beta-epoxy aliphatic hydrocarbon amides of 4 to 12 carbon atoms of the invention of which 3-methyl-2-cyano-2,3-epoxybutyramide is an example. These are also suitable for polymerization to homo- or copolymers by reaction in the presence of these same catalysts. By hydrolysis of the nitrile groups in the resulting polymers, one can obtain carboxylic acid-containing resins useful as cation exchangers for example.

It will be seen that the invention is capable of considerable variation and is not limited to the examples which have been given by way of illustration only. Nor is the invention limited by the theory given to explain the improved results which are obtained.

I claim as my invention:

1. A process which comprises reacting an aliphatic nitrile of the group consisting of (1) nitriles of 3 to 12 carbon atoms per molecule of the formula

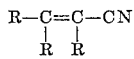

wherein each R is a member of the group consisting of hydrogen and lower alkyl and (2) nitriles of said formula substituted by a member of the group consisting of halogen,

and unsubstituted carboxylic acid ester groups with hydrogen peroxide while maintaining the pH of the reaction mixture in the range of about 6.0 to about 9.0 so that alpha,beta-epoxy aliphatic amide corresponding to said nitrile is produced with consumption of only about one mole of peroxide per mole of said corresponding epoxy amide and substantial evolution of oxygen does not take place.

2. A process in accordance with claim 1 wherein the nitrile reacted is an alpha,beta-ethylenic aliphatic hydrocarbon mononitrile composed only of carbon, hydrogen and the nitrile nitrogen atoms and the reaction is carried out in the liquid phase with an initial hydrogen peroxide concentration in the reaction mixture of at least about 5% by weight at a temperature below 100° C.

3. A process which comprises reacting an aliphatic alpha,beta-ethylenic nitrile having 3 to 12 carbon atoms per molecule and composed only of carbon, hydrogen and nitrile nitrogen atoms in which the only multiple linkage between carbon atoms is said alpha,beta-ethylenic group with hydrogen peroxide having an initial concentration of about 5% to about 70% by weight while maintaining the pH of the reaction mixture in the range of about 6.0 to about 9.0 to produce the corresponding alpha,beta-epoxy aliphatic saturated amide without substantial evolution of oxygen and consumption of only about one mole of peroxide per mole of said corresponding epoxy amide which is produced.

4. A process for producing glycidamide which comprises reacting unsubstituted acrylonitrile with one mole of hydrogen peroxide per mole of said nitrile at about 25° to about 50° C. while maintaining the pH of the reaction mixture in the range of about 6.0 to about 9.0.

5. A process for producing alpha-lower alkyl glycidamide which comprises reacting unsubstituted alpha-alkyl acrylonitrile having 1 to 3 carbon atoms in said alkyl group with one mole of hydrogen peroxide per mole of said nitrile at about 25° to about 50° C. while maintaining the pH of the reaction mixture in the range of about 6.0 to about 9.0.

6. A process in accordance with claim 5 wherein alpha-methylglycidamide is produced from alpha-methylacrylonitrile.

7. A process for producing alpha,beta-epoxy-alpha-cyanoaliphatic hydrocarbon amide which comprises reacting unsubstituted alkylidene-malononitrile having four to 12 carbon atoms per molecule with one mole of hydrogen peroxide per mole of said nitrile at about 25° to about 50° C. while maintaining the pH of the reaction mixture in the range of about 6.0 to about 9.0.

8. A process for producing 3-methyl-2-cyano-2,3-epoxybutyramide which comprises reacting isopropylidene-malononitrile with one mole of hydrogen peroxide per mole of said nitrile while maintaining the pH of the reaction mixture in the range of about 6.0 to about 9.0.

9. Unsubstituted, saturated alpha-cyano-alpha,beta-epoxy aliphatic hydrocarbon amide of 4 to 10 carbon atoms.

10. 3-Methyl-2-cyano-2,3-epoxybutyramide.

References Cited in the file of this patent

UNITED STATES PATENTS

| | | |
|---|---|---|
| 2,493,090 | Shelton et al. | Jan. 3, 1950 |
| 2,785,185 | Phillips et al. | Mar. 12, 1957 |
| 2,833,787 | Carlson et al. | May 6, 1958 |

FOREIGN PATENTS

| | | |
|---|---|---|
| 586,645 | Germany | Oct. 25, 1953 |

OTHER REFERENCES

McMasters et al.: J.A.C.S., volume 39, pages 103–109 (1917) (pages 108–109 relied on).

Murray et al.: J.A.C.S., volume 56, pages 2749–51 (1934).

Fourneau et al.: Chem. Abstr., volume 34, pages 2792–3 (1940).

Newman: Organic Reactions, volume 5, page 424 (1949).

Wiley et al.: J. Org. Chem., volume 15, pages 800–801 (1950).

Wiberg: J.A.C.S., volume 75, pages 3961–3964 (1953).

Martynov: Chem. Abstr., volume 48, page 13646 (1954).

Chemical Abstracts: Subject Index, volume 49, page 967 S (1955).

Chemical Abstracts: Subject Index, volume 50, page 110 S (1956).

Rittinger: Darstellung and Reaktionen von Glycidsaurennitrile, page 6, 1957.